United States Patent
Kondo et al.

(10) Patent No.: US 6,961,485 B2
(45) Date of Patent: Nov. 1, 2005

(54) OPTICAL SWITCH

(75) Inventors: Michikazu Kondo, Ryuugasaki (JP); Kei Chiba, Ichinoseki (JP); Masao Saito, Ichinoseki (JP)

(73) Assignees: NEC Tokin Corporation, Sendai (JP); NEC Tokin Iwate, Ltd., Ichinoseki (JP)

( * ) Notice: Subject to any disclaimer, the term of this patent is extended or adjusted under 35 U.S.C. 154(b) by 122 days.

(21) Appl. No.: 10/648,864

(22) Filed: Aug. 25, 2003

(65) Prior Publication Data

US 2004/0067010 A1    Apr. 8, 2004

(30) Foreign Application Priority Data

Aug. 28, 2002 (JP) ............................ 2002-248012
Jan. 14, 2003 (JP) ............................ 2003-005375

(51) Int. Cl.⁷ .............................................. G02B 6/35
(52) U.S. Cl. ........................... 385/16; 385/18; 385/19; 385/25
(58) Field of Search ........................ 385/16–20, 50, 385/25, 31

(56) References Cited

U.S. PATENT DOCUMENTS

| | | |
|---|---|---|
| 4,239,331 A | 12/1980 | Aoyama |
| 4,322,126 A | 3/1982 | Minowa et al. |
| 5,015,978 A | 5/1991 | Yokoo et al. |
| 5,268,975 A | 12/1993 | Yoshitani et al. |
| 5,455,707 A | 10/1995 | Cipolla |
| 5,999,669 A | 12/1999 | Pan et al. |
| 6,215,919 B1 | 4/2001 | Li et al. |
| 6,353,692 B1 | 3/2002 | Colbourne |
| 6,385,365 B1 * | 5/2002 | Rosete et al. ............ 385/23 |
| 6,394,617 B1 | 5/2002 | Wu |
| 6,526,194 B1 * | 2/2003 | Laor ........................ 385/18 |
| 2002/0181839 A1 * | 12/2002 | Brown et al. ............ 385/16 |

FOREIGN PATENT DOCUMENTS

| | | | | |
|---|---|---|---|---|
| EP | 1 049 127 A2 | 11/2000 | | |
| EP | 1049127 A2 * | 11/2000 | .......... | H01H 51/22 |
| EP | 1 207 416 A1 | 5/2002 | | |
| JP | 63-301441 A | 12/1988 | | |
| JP | 63301441 | * 12/1988 | .......... | H01H 51/22 |
| JP | 2000-311568 A | 11/2000 | | |
| JP | 2001-174725 A | 6/2001 | | |

* cited by examiner

Primary Examiner—John D. Lee
Assistant Examiner—James D. Stein
(74) Attorney, Agent, or Firm—Frishauf, Holtz, Goodman & Chick, P.C.

(57) ABSTRACT

An optical switch has an electromagnetic driving mechanism that includes a U-shaped magnetic core having an intermediate portion between two leg parts, a coil wound on the U-shaped magnetic core, an armature having two end portions that can face each other on the two leg parts and supported in such a manner that the armature can make an oscillating motion, and a permanent magnet arranged to apply a magnetic flux to the U-shaped magnetic core and the armature. The optical switch also has a mirror as an optical path switching unit directly fixed on the armature, an incidence-side optical fiber for making light incident on the mirror, and emission-side optical fibers where the light with its optical path switched by the mirror is coupled.

20 Claims, 11 Drawing Sheets

180# OPTICAL SWITCH

This application claims priority to prior Japanese applications JP 2002-248012 and JP 2003-005375, the disclosures of which are incorporated herein by reference.

BACKGROUND OF THE INVENTION

This invention relates to an optical part used for an optical communication system, and particularly to an optical switch suitable for switching or intercepting an optical path.

There are two types of optical switches. The first type is a waveguide type optical switch using a quartz optical waveguide or a lithium niobate crystal optical waveguide. The second type is a mechanical optical switch that mechanically moves an optical fiber or a prism.

An optical switch of the first type performs switching by changing the refractive index of a part of an optical waveguide. To change the refractive index of a part of the optical waveguide, a current is caused to flow through a thin film electric heater installed on the optical waveguide, or a voltage is applied to an electrode using an electro-optical effect. The optical switch of the first type has the advantage of being reliable because it has no moving part. However, the optical switch of the first type has a problem that it is generally expensive and has large loss. Therefore, most of the optical switches that are actually used are those of the second type.

As an optical switch of the second type, there is known an optical switch having an input optical fiber, a flat optical waveguide plate arranged at a position facing an output end surface on the input optical fiber, plural output optical fibers fixed on this flat optical waveguide plate, and a moving unit for relatively moving the positions of the input optical fiber and the flat optical waveguide plate. This optical switch switches an optical path by mechanically changing the relative positions of the input optical fiber and the flat optical waveguide plate. Such an optical switch is disclosed, for example, in JP-A-2001-174725. The optical switch of the second type is less expensive and has smaller loss than the optical switch of the first type. However, since the optical switch of the second type has a moving part, its reliability is low.

As optical communication networks have been recently set up in various areas of cities, an optical switch of lower price and higher reliability is required in order to realize a function of flexibly controlling signal paths of the networks.

SUMMARY OF THE INVENTION

In order to meet the foregoing requirement, it is an object of the present invention to provide an optical switch of higher reliability and lower price than the conventional mechanical optical switch.

An optical switch according to the present invention has an electromagnetic driving mechanism that includes a U-shaped magnetic core having an intermediate portion between two leg parts, a coil wound on the U-shaped magnetic core, a soft magnetic armature having two end portions that can face each other on the two leg parts and supported in such a manner that the armature can make an oscillating motion, and a permanent magnet arranged to apply a magnetic flux to the U-shaped magnetic core and the armature. The optical switch further has at least one optical path switching unit directly fixed on the armature, at least one incidence-side optical fiber for making light incident on the optical path switching unit, and at least one emission-side optical fiber where the light with its optical path switched by the optical path switching unit is coupled.

It is desired that the optical switch according to the present invention has an incidence-side optical system for guiding the light from the incidence-side optical fiber to the optical path switching unit, and an emission-side optical system for guiding the light with its optical path switched by the optical path switching unit to the emission-side optical fiber.

In the optical switch according to the present invention, the oscillating motion of the armature is a reciprocating turning motion about a portion near a central portion of the armature as a fulcrum. The turning motion is generated by switching a magnetically attracting force that acts between one of the leg parts of the U-shaped magnetic core and one of the end portions of the armature that faces the leg part, and a magnetically attracting force that acts between the other leg part of the U-shaped magnetic core and the other end portion of the armature that faces the leg part.

In a first embodiment of the optical switch according to the present invention, the optical path switching unit includes a first mirror. The first mirror is directly installed on the armature and in such a manner that it has a light reflecting direction within a plane substantially parallel to the oscillating direction of armature.

In a second embodiment of the optical switch according to the present invention, the optical path switching unit includes a second mirror having at least one reflection surface. The second mirror is directly installed on the armature and in such a manner that it has a light reflecting direction within a plane substantially perpendicular to the oscillating direction of the armature.

Alternatively, the optical switching unit may also be a plate member directly fixed on the armature and adapted for intercepting light from the incidence-side optical fiber.

In a third embodiment of the optical switch according to the present invention, the optical path switching unit includes a transparent member. The transparent member has a plane of light incidence and a plane of light emission that are substantially parallel to each other and substantially parallel to the oscillating direction of the armature.

In a fourth embodiment of the optical switch according to the present invention, the optical path switching unit includes a transparent member. The transparent member has a plane of light incidence and a plane of light emission that are not parallel to each other and substantially parallel to the oscillating direction of the armature.

In a fifth embodiment of the optical switch according to the present invention, the optical path switching unit includes a transparent member. The transparent member has two sets of planes of light incidence and planes of light emission that are substantially parallel to each other and substantially parallel to the oscillating direction of the armature.

Preferably, the transparent member has a rectangular flat shape.

The optical path switching unit may be provided near one of the end portions of the armature that faces one of the leg parts of the U-shaped magnetic core, or may be provided near the two end portions of the armature that face the two leg parts, respectively.

At least one of the incidence-side optical fiber and the emission-side optical fiber may be provided in plural numbers.

In the optical switch according to the present invention, the permanent magnet may be arranged between the U-shaped magnetic core and the armature, and one magnetic pole end of the permanent magnet may be situated near the center of the intermediate portion of the U-shaped magnetic core while the other magnetic pole end of the permanent magnet may be situated near the fulcrum of the oscillating motion of the armature.

Moreover, in the optical switch according to the present invention, the permanent magnet may be a composite permanent magnet having one magnetic pole on its both ends and the other magnetic pole at its central portion and may be provided between the two leg parts of the U-shaped magnetic core.

Furthermore, in the optical switch according to the present invention, the permanent magnet may be fixed to the armature in such a manner that its one magnetic pole comes into contact with the armature and may be caused to swing or oscillate together with the armature.

The electromagnetic driving mechanism may further include a fixed-side insulator base for integrally holding the U-shaped magnetic core and the permanent magnet, and a-moving-side insulator for holding the armature. In this case, the U-shaped magnetic core and the permanent magnet are fixed by integral molding of the fixed-side insulator base, with the permanent magnet held in contact with a part of the U-shaped magnetic core.

The electromagnetic driving mechanism may further include a hinge spring part for supporting the armature while applying an energizing force or a damping force to the oscillating motion of the armature, and a moving spring part interlocked with the oscillating motion of the armature.

BRIEF DESCRIPTION OF THE DRAWINGS

FIG. 1A shows a state where a coil is not excited. FIG. 1B shows a state where the coil is excited. FIG. 1C shows another state where the coil is not excited;

DESCRIPTION OF THE PREFERRED EMBODIMENTS

Figure 4A:
FIGS. 4A and 4B are perspective views schematically showing an optical switch according to a first embodiment of the present invention and showing states where an optical path is switched.
Figure 4A:
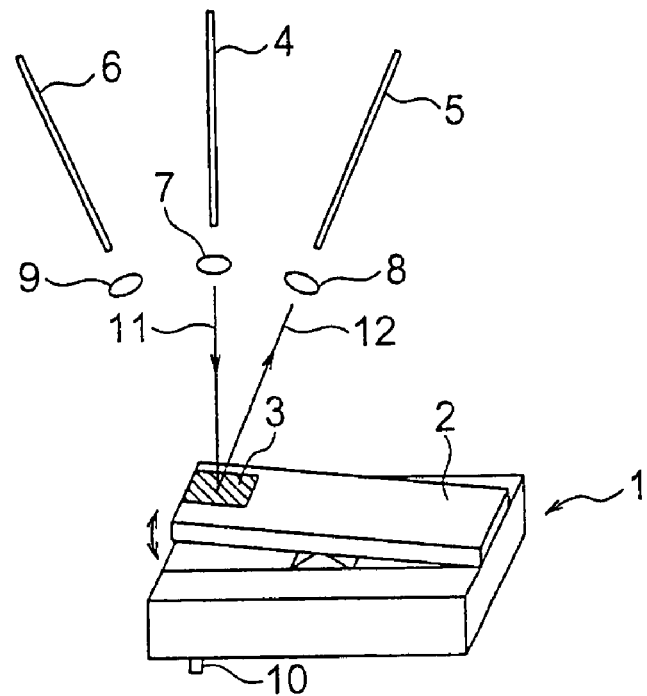
Figure 4B:
Figure 4B:
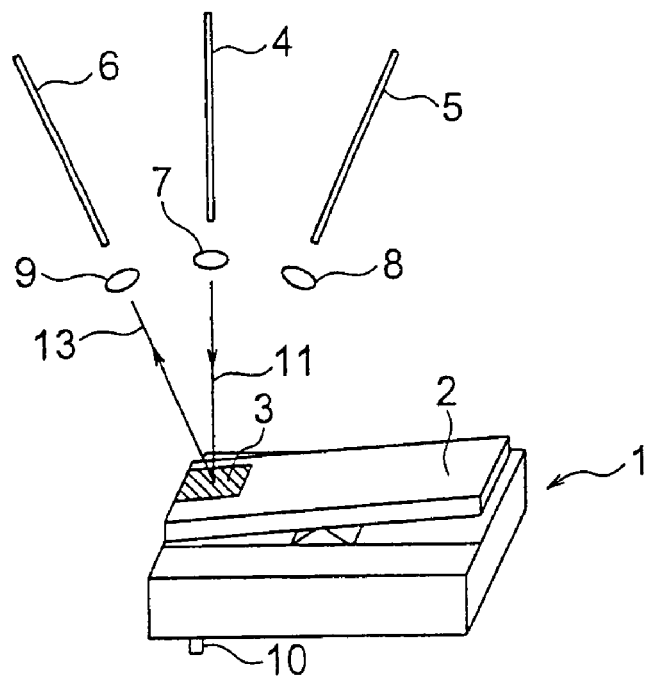

FIGS. 4A and 4B are perspective views schematically showing an optical switch according to a first embodiment of the present invention and showing states where an optical path is switched.

In FIGS. 4A and 4B, the optical switch has an electromagnetic driving mechanism 1. As will be later described in detail, the electromagnetic driving mechanism 1 has an armature 2 supported in such a manner that it can swing or oscillate, and two electrode terminals 10 (only one is shown) for causing a current to flow through a coil included in the electromagnetic driving mechanism 1. Preferably, the armature 2 is made of soft magnetic material, such as an iron.

A mirror (first mirror) 3 is directly installed on an upper surface of one end portion of the armature 2. The mirror 3 is formed by a thin glass or crystal plate coated with a reflection film. An incidence-side optical fiber 4 and emission-side optical fibers 5 and 6 are installed above the mirror 3. Between the mirror 3 and the incidence-side optical fiber 4, a lens (incidence-side optical system) 7 for guiding emitted light from the incidence-side optical fiber 4 to the mirror 3 is installed. Between the mirror 3 and the emission-side optical fiber 5, a lens (emission-side optical system) 8 for guiding light reflected by the mirror 3 to the emission-side optical fiber 5 is installed. Similarly, a lens 9 for guiding light reflected by the mirror 3 to the emission-side optical fiber 6 is installed between the mirror 3 and the emission-side optical fiber 6. Hereinafter, the end portion of the armature 2 where the mirror 3 is installed is referred to as one end portion, and the end portion on the opposite side is referred to as the other end portion.

As will be described later, the electromagnetic driving mechanism 1, the optical fibers 4, 5, 6, and the lenses 7, 8, 9 are fixed to one casing by adhering, soldering or welding.

Figure 1A:
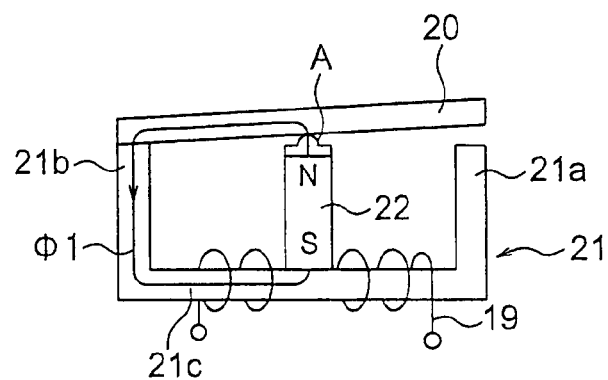
FIGS. 1A to 1C are views showing a first example of an electromagnetic driving mechanism used for the optical switch of the present invention.
Figure 1B:
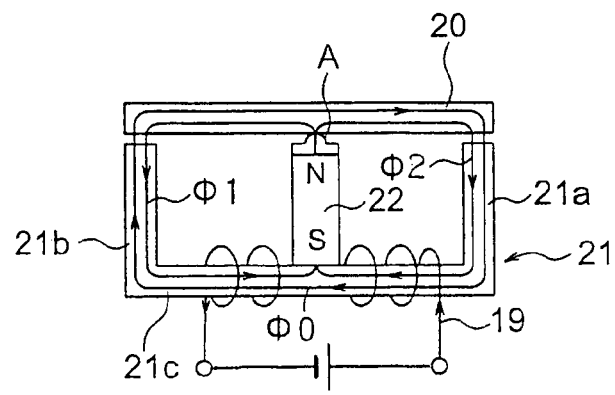
Figure 1C:
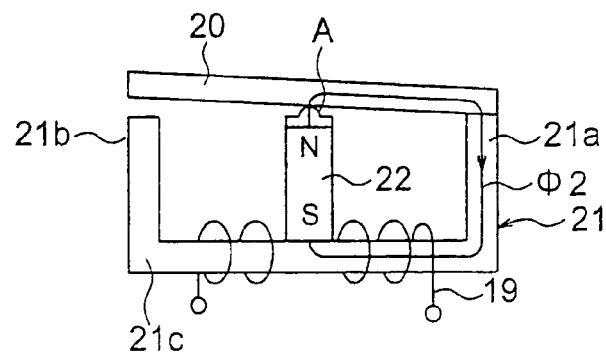

FIGS. 1A to 1C are views for explaining the principle of operation of a first example of the electromagnetic driving mechanism used for the optical switch of FIGS. 4A and 4B.

In FIGS. 1A to 1C, the electromagnetic driving mechanism includes an armature 20, a coil 19, a U-shaped iron core 21 having two leg parts 21a, 21b and an intermediate part 21c connecting these leg parts, and a permanent magnet 22. The coil 19 is wound on the intermediate part 21c of the U-shaped iron core 21. One end portion of the permanent magnet 22 is fixed to a central portion on the inner side of the intermediate part 21c. The armature 20, which makes an oscillating motion, is arranged in such a manner that its two end portions face the leg parts 21a, 21b, respectively, while the other end portion of the permanent magnet 22 serves as a fulcrum A of the oscillating motion. In other words, as the armature 20 has its intermediate part supported by a protrusion provided at the other end portion of the permanent magnet 22, the armature 20 can make an oscillating motion, that is, a seesaw motion, about the protrusion as the fulcrum A.

FIG. 1A shows a state where the coil 19 is not excited. In this case, the armature 20 is attracted toward the leg part 21b by a magnetic flux $\phi 1$ generated by the permanent magnet 22.

FIG. 1B shows a state where the coil 19 is excited. In this state, a magnetic flux $\phi 0$ generated in the U-shaped iron core 21 by the excitation of the coil 19 offsets the magnetic flux $\phi 1$ while the magnetic flux $\phi 0$ is added to a magnetic flux $\phi 2$ generated by the permanent magnet 22. As a result, the armature 20 turns clockwise about the fulcrum A and the armature 20 is attracted toward the leg part 21a. In this state, even if the excitation of the coil 19 is stopped, the attraction of the armature 20 toward the leg part 21a by the magnetic flux $\phi 2$ from the permanent magnet 22 is maintained, as shown in FIG. 1C.

To restore the state of FIG. 1A from the state of FIG. 1C, the current flowing through the coil 19 can be caused to flow in the opposite direction.

Such an electromagnetic driving mechanism is disclosed, for example, in JP-A-63-301441.

Referring again to FIGS. 4A and 4B, the operation of the optical switch according to the first embodiment will be described. FIG. 4A shows a state where the other end portion of the armature 2 is attracted to the U-shaped iron core. FIG. 4B shows a state where one end portion of the armature 2 is attracted to the U-shaped iron core.

In FIG. 4A, light 11 from the incidence-side optical fiber 4 is collimated by the lens 7 and becomes incident on the mirror 3. Light 12 reflected upward by the mirror 3 is converged by the lens 8 and becomes incident on the emission-side optical fiber 5.

Next, as a current is caused to flow through the coil from the electrode terminals 10, the armature 2 turns counterclockwise into the state of FIG. 4B. In this state, the light 11 from the incidence-side optical fiber 4 is reflected by the mirror 3 in a direction that is different from the direction in the case of FIG. 4A. Reflected light 13 is converged through the lens 9 and becomes incident on the emission-side optical fiber 6.

To restore the state of FIG. 4A from the state of FIG. 4B, the current flowing through the coil from the electrode terminals 10 can be caused to flow in the opposite direction.

By switching the direction of the current flowing through the coil from the electrode terminals 10 as described above, it is possible to switch the combination of the incidence-side optical fiber 4 and the emission-side optical fiber 5 or 6. In short, the provision of light from the incidence-side optical fiber 4 can be switched to one of two output ports.

The electromagnetic driving mechanism having the structure shown in FIGS. 1A to 1C has the same structure and principle as those of a conventionally electromagnetic relay. Therefore, the electromagnetic driving mechanism has been practically used for several years and highly reliable. For this electromagnetic driving mechanism, an inexpensive manufacturing method has been established. Moreover, the optical parts used for this electromagnetic driving mechanism are generally used for conventional optical devices. Therefore, the optical switch according to the first embodiment can be manufactured inexpensively and in a small size.

Figure 2A:
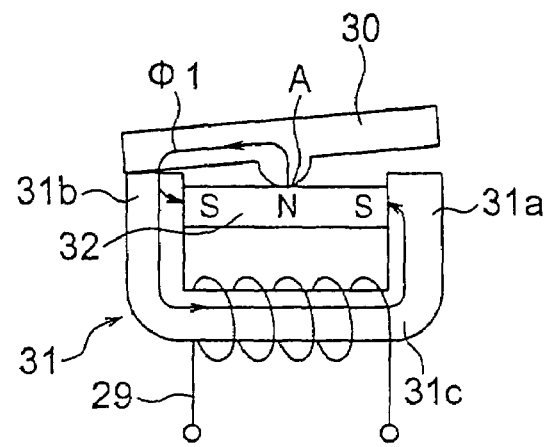
FIGS. 2A to 2C are views showing a second example of the electromagnetic driving mechanism used for the optical switch of the present invention, FIG. 2A showing a state where a coil is not excited, FIG. 2B showing a state where the coil is excited, FIG. 2C showing another state where the coil is not excited.
Figure 2B:
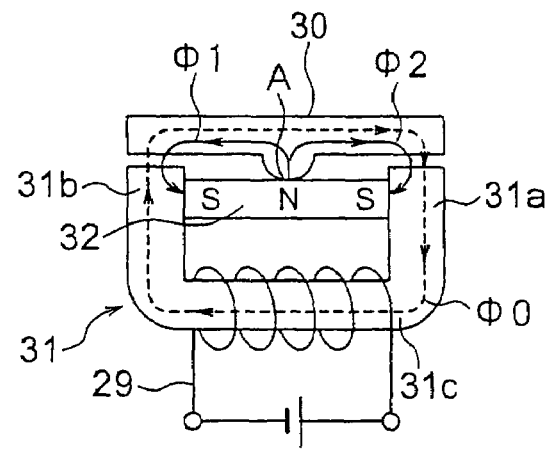
Figure 2C:
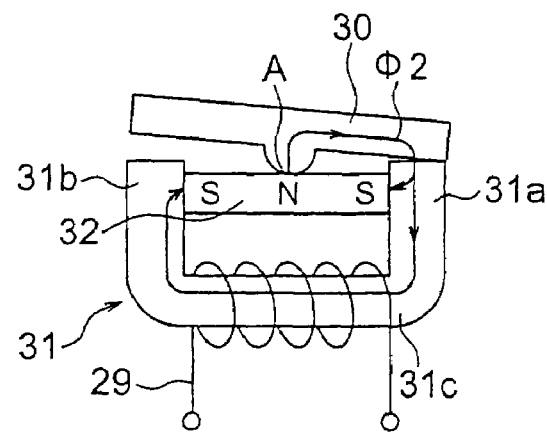

FIGS. 2A to 2C are view for explaining the principle of operation of a second example of the electromagnetic driving mechanism used for the optical switch of the present invention.

In FIGS. 2A to 2C, the electromagnetic driving mechanism includes a coil 29, an armature 30, a U-shaped iron core 31 having two leg parts 31a, 31b and an intermediate part 31c connecting these leg parts, and a permanent magnet 32. The permanent magnet 32 is a composite permanent magnet having an N pole at its center and an S pole at its two end portions. Of course, the permanent magnet 32 may be a composite permanent magnet having the S pole at its center and the N pole at its two end portions. The coil 29 is wound on the intermediate part 31c of the U-shaped iron core 31. The permanent magnet 32 is fixed between an upper portion of the leg part 31a and an upper portion of the leg part 31b of the U-shaped iron core 31. The armature 30, which makes an oscillating motion, is arranged in such a manner that its two end portions face the leg parts 31a, 31b, respectively. Particularly, a protrusion to be the fulcrum A of the oscillating motion is provided at a central lower portion of the armature 30, and the protrusion is arranged to be in contact with a central portion of the permanent magnet 32.

FIG. 2A shows a state where the coil 29 is not excited. In this state, the armature 30 is attracted toward the leg part 31b by a magnetic flux $\phi 1$ generated by the permanent magnet 32.

FIG. 2B shows a state where the coil 29 is excited. As the coil 29 is excited, a magnetic flux $\phi 0$ generated in the U-shaped iron core 31 offsets the magnetic flux $\phi 1$ while a magnetic flux $\phi 2$ generated by the permanent magnet 32 is added to the magnetic flux $\phi 0$ in the armature 30 on the side of the leg part 31a. As a result, the armature 30 turns clockwise about the fulcrum A. In this state, even if the excitation of the coil 29 is stopped, the attraction of the armature 30 toward the leg part 31a by the magnetic flux $\phi 2$ from the permanent magnet 32 is maintained, as shown in FIG. 2C.

To restore the state of FIG. 2A from the state of FIG. 2C, the current flowing through the coil 29 can be caused to flow in the opposite direction.

Also this electromagnetic driving mechanism has the same structure and principle as those of a conventionally electromagnetic relay. Therefore, the electromagnetic driving mechanism has high reliability and an inexpensive manufacturing method for it has been established.

Such an electromagnetic driving mechanism is disclosed, for example, in the JP-A-2000-311568.

Figure 3A:
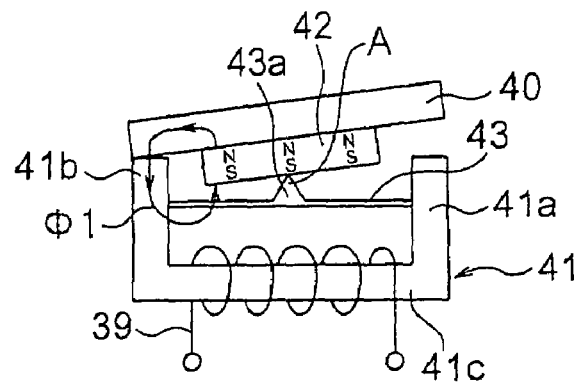
FIGS. 3A to 3C are views showing a third example of the electromagnetic driving mechanism used for the optical switch of the present invention, FIG. 3A showing a state where a coil is not excited, FIG. 3B showing a state where the coil is excited, FIG. 3C showing another state where the coil is not excited.
Figure 3B:
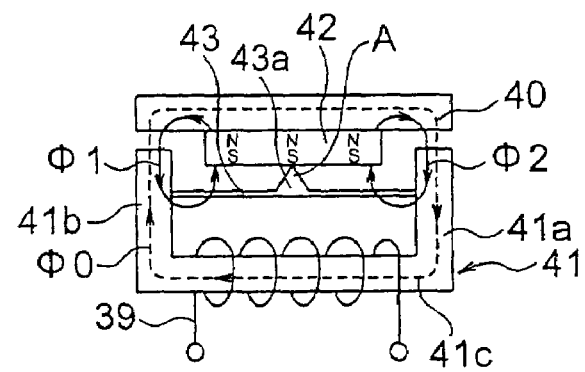
Figure 3C:
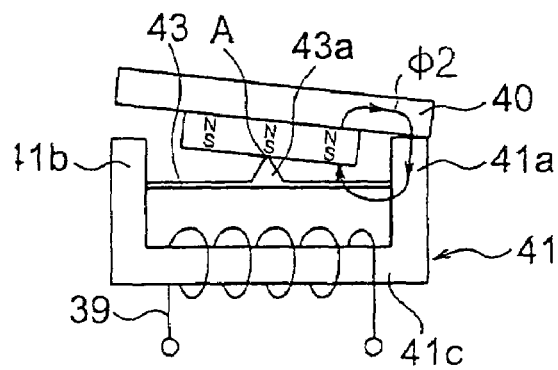

FIGS. 3A to 3C are view for explaining the principle of operation of a third example of the electromagnetic driving mechanism used for the optical switch of the present invention.

In FIGS. 3A to 3C, the electromagnetic driving mechanism includes a coil 39, an armature 40, a U-shaped iron core 41 having two leg parts 41a, 41b and an intermediate part 41c connecting these leg parts, and a permanent magnet 42. The coil 39 is wound on the intermediate part 41c of the U-shaped iron core 41. The armature 40, which makes an oscillating motion, is arranged in such a manner that its two end portions face the leg parts 41a, 41b, respectively. At a lower central portion of the armature 40, the permanent magnet 42 is installed in such a manner that it has the N pole on the side of the armature 40 and the S pole on the opposite side. Of course, the permanent magnet 42 may be installed in such a manner that it has the S pole on the side of the armature 40 and the N pole on the opposite side. Between the two leg parts 41a, 41b, a supporting member 43 having an upward protrusion 43a is provided. As the permanent magnet 42 has its central portion supported by the protrusion 43a, the protrusion 43a serves as the fulcrum A of the oscillating motion of the armature 40. The supporting member 43 is made of a non-magnetic material.

FIG. 3A shows a state where the coil 39 is not excited. In this state, the armature 40 is attracted toward the leg part 41b by a magnetic flux $\phi 1$ generated by the permanent magnet 42.

FIG. 3B shows a state where the coil 39 is excited. In this state, a magnetic flux $\phi 0$ generated in the U-shaped iron core 41 by the excitation of the coil 39 offsets the magnetic flux $\phi 1$ while a magnetic flux $\phi 2$ generated by the permanent magnet 42 is added to the magnetic flux $\phi 0$ in the armature 40 on the side of the leg part 41a. As a result, the armature 40 turns clockwise about the fulcrum A. In this state, even if the excitation of the coil 39 is stopped, the attraction of the armature 40 toward the leg part 41a by the magnetic flux $\phi 2$ is maintained, as shown in FIG. 3C.

To restore the state of FIG. 3A from the state of FIG. 3C, the current flowing through the coil 39 can be caused to flow in the opposite direction.

Also this electromagnetic driving mechanism has the same structure and principle as those of a conventionally electromagnetic relay. Therefore, the electromagnetic driving mechanism has high reliability and an inexpensive manufacturing method for it has been established.

Figure 5A:
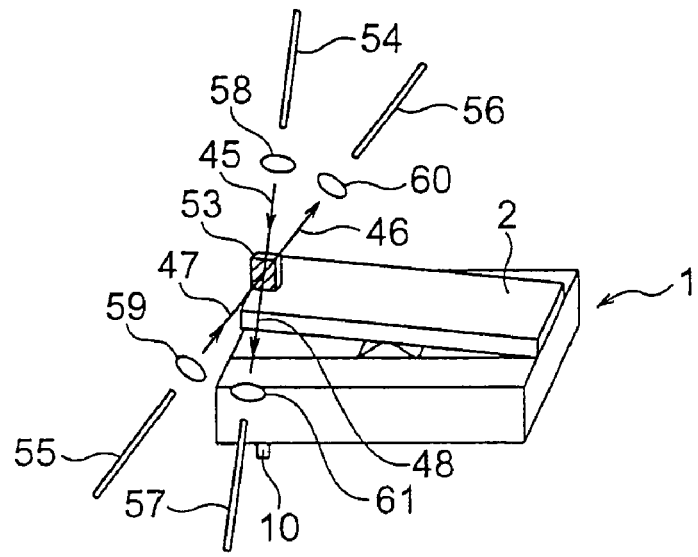
FIGS. 5A and 5B are perspective views schematically showing an optical switch according to a second embodiment of the present invention and showing states where an optical path is switched.
Figure 5B:
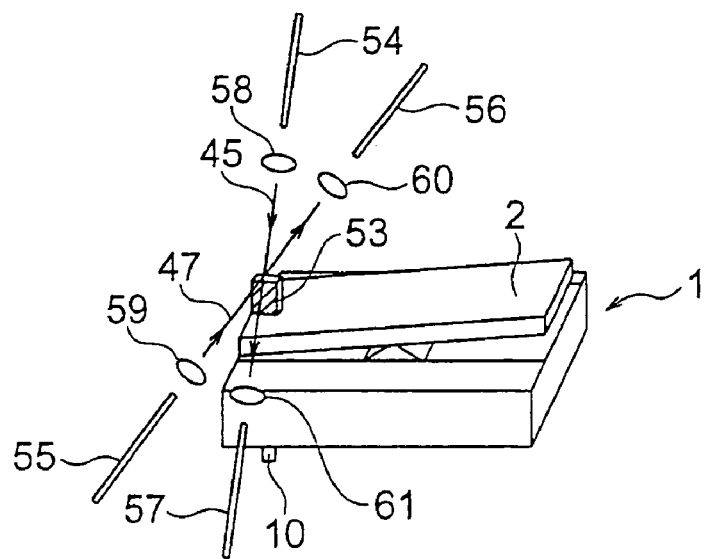

FIGS. 5A and 5B are perspective view showing a second embodiment of the optical switch according to the present invention. FIGS. 5A and 5B show states where an optical path is switched.

In FIGS. 5A and 5B, the optical switch has an electromagnetic driving mechanism 1. The electromagnetic driving mechanism 1 has an armature 2 supported in such a manner that it can swing or oscillate, and two electrode terminals 10 (only one is shown) for causing a current to flow through a coil included in the electromagnetic driving mechanism 1. A mirror (second mirror) 53 is directly installed on an upper surface of one end portion of the armature 2. The mirror 53 is installed with its reflection surface substantially parallel to the oscillating direction of the armature 2. The mirror 53 is formed by a glass plate or crystal plate coated with a reflection film. The mirror 53 has the reflection surface on both sides.

An incidence-side optical fiber 54 and an emission-side optical fiber. 56 are installed on the side of one reflection surface of the mirror 53. On the side of the other reflection surface of the mirror 53, an emission-side optical fiber 57 and an incidence-side optical fiber 55 are installed at positions that are symmetrical with the incidence-side optical fiber 54 and the emission-side optical fiber 56 about the light reflection point of the mirror 53.

On the side of one reflection surface of the mirror 53, a lens 58 for guiding emitted light from the incidence-side optical fiber 54 to the mirror 53 is installed and a lens 60 for guiding light reflected by the mirror 53 to the emission-side optical fiber 56 is installed. Similarly, on the side of the other reflection surface of the mirror 53, a lens 59 for guiding emitted light from the incidence-side optical fiber 55 to the mirror 53 is installed and a lens 61 for guiding light reflected by the mirror 53 to the emission-side optical fiber 57 is installed. Hereinafter, the end portion of the armature 2 where the mirror 53 is installed is referred to as one end portion, and the end portion on the opposite side is referred to as the other end portion.

As will be described later, the electromagnetic driving mechanism 1, the optical fibers 54, 55, 56, 57 and the lenses 58, 59, 60, 61 are fixed to one casing by adhering, soldering or welding.

As the electromagnetic driving mechanism 1 used in the second embodiment, any one of the electromagnetic driving mechanisms shown in FIGS. 1A to 1C, FIGS. 2A to 2C and FIGS. 3A to 3C can be used. This also applies third to seventh embodiments, which will be described later.

Now, the operation of the optical switch according to the second embodiment will be described. FIG. 5A shows a state where the other end portion of the armature 2 is attracted to the U-shaped iron core. In this state, light from the incidence-side optical fibers 54, 55 becomes incident on the mirror 53. FIG. 5B shows a state where one end portion of the armature 2 is attracted to the U-shaped iron core. In this state, light from the incidence-side optical fibers 54, 55 passes above the mirror 53.

In FIG. 5A, light 45 from the incidence-side optical fiber 54 is collimated by the lens 58 and becomes incident on one reflection surface of the mirror 53. Light 46 reflected by the mirror 53 is converged by the lens 60 and becomes incident on the emission-side optical fiber 56. On the other hand, light 47 from the incidence-side optical fiber 55 is collimated by the lens 59 and becomes incident on the other reflection surface of the mirror 53. Light 48 reflected by the mirror 53 is converged by the lens 61 and becomes incident on the emission-side optical fiber 57.

Next, when a current is caused to flow through the coil from the electrode terminals 10, the armature 2 turns counterclockwise into the state of FIG. 5B. In this state, the mirror 53 moves downward. As a result, the lights 45, 47 emitted from the incidence-side optical fibers 54, 55 pass above the mirror 53 and become incident on the emission-side optical fibers 57, 56 installed on the opposite side of the mirror 53 via the lenses 61, 60, respectively.

To restore the state of FIG. 5A form the state of FIG. 5B, the current can be caused to flow through electrode terminals 10 in the opposite direction.

By switching the direction of the current flowing through the electrode terminals 10 as described above, it is possible to switch the provision of light from the incidence-side optical fibers 54, 55 to one of two output ports.

Meanwhile, the shape of the mirror 53, the position of installation of the mirror 53 and the diameter of light beam are designed in consideration of the moving distance of the armature 2 (normally 0.3 to 0.6 mm). That is, these are so set that most of the lights 45, 47 emitted from the incidence-side optical fibers 54, 55 are reflected by the mirror 53 in the state of FIG. 5A, whereas most of the lights 45, 47 pass above the mirror 53 in the state of FIG. 5B. The thickness of the mirror 53 is set to be sufficiently thin, that is, approximately 0.1 to 1 mm, so as not to increase loss of light in both optical path switching states.

In the second embodiment, as the mirror 53 is installed only at one end portion of the armature 2, the optical switch that switches 2×2 ports is realized. However, by installing a mirror also at the other end portion of the armature 2 and arranging two incidence-side optical fibers and two emission-side optical fibers with respect to that mirror, it is possible to realize an optical switch that switches two channels of 2×2 ports.

Moreover, by providing a set of multiple directions of incidence and emission with respect to one mirror, it is possible to construct an optical switch with more channels. For example, by installing another set of incidence-side optical fiber and emission-side optical fiber within a plane perpendicular to the plane where the incidence-side optical fiber and the emission-side optical fiber are arranged in FIG. 5A, it is possible to construct a multi-channel optical switch.

Also in the second embodiment, the electromagnetic driving mechanism can use a driving mechanism of a highly reliable electromagnetic relay and optical parts used therein are inexpensive. Therefore, an optical switch that is inexpensive, small-sized and highly reliable can be realized.

The mirror 53 may be a mirror having a function which reflects light only on one side. For example, if the mirror 53 has a reflection surface only on the side of the incidence-side optical fiber 55, the optical switch switches the provision of light from the incidence-side optical fiber 55 to one of the emission-side optical fibers 56, 57. Therefore, the incidence-side optical fiber 54 is omitted in this case.

Moreover, by installing a light intercepting plate instead of the mirror 53 in FIG. 5A, it is possible to realize a light intercepting type optical switch. Such a plate is made of a metal material, formed in the same shape as the mirror 53, and fixed to the armature 2 in the same method as in the case of the mirror 53.

In the first and second embodiments, the lenses are used for collimating emitted light from the optical fiber and combining the collimated light to the optical fiber. However, if a TEC fiber with an expanded core part is used as the optical fiber, the lenses can be omitted.

In the first and second embodiments, the optical fiber is used as an input port for guiding light into the optical switch or as an output port for guiding the light out of the optical switch. However, a typical optical waveguide may also be used.

In the first and second embodiments, the U-shaped iron core is used for guiding the magnetic fluxes from the permanent magnet and the coil. However, a U-shaped magnetic core made of a typical soft magnetic material may also be used.

The electromagnetic driving mechanisms described above with reference to FIGS. 1A to 1C and FIGS. 2A to 2C may be produced by integral molding. Specifically, a fixed-side insulator base for integrally holding the U-shaped iron core and the permanent magnet and a moving-side insulator for holding the armature are formed by integral molding, with the permanent magnet kept in contact with a part of the U-shaped iron core. According to such a forming method, since the permanent magnet and the U-shaped iron core need not be fixed to each other with an adhesive, the waiting time for hardening of the adhesive is no longer necessary. Moreover, as the integral molding simplifies the manufacturing process, the positional accuracy between the U-shaped iron core, the permanent magnet and the electrode terminals can be improved. Such a manufacturing method and the structure of such an electromagnetic driving mechanism will be later described in detail with reference to the drawing.

The electromagnetic driving mechanisms described above with reference to FIGS. 1a to 1C and FIGS. 2A to 2C may also be produced as follows. That is, the electromagnetic driving mechanism may have a hinge spring for supporting the armature while applying an energizing force or a damping force to the oscillating motion of the armature, and a moving spring interlocked with the oscillating motion of the armature, as used in an electromagnetic relay. This provides an additional force to the oscillating motion of the armature and therefore can reduce the consumed electric power necessary for performing the switching operation of the optical switch. Moreover, by using an end portion of the moving spring as an electric contact, it is possible to check the state of the oscillating motion of the armature and to grasp the switching state and stabilize the operation. Again, the structure of such an electromagnetic driving mechanism will be later described in detail with reference to the drawing.

Figure 6A:
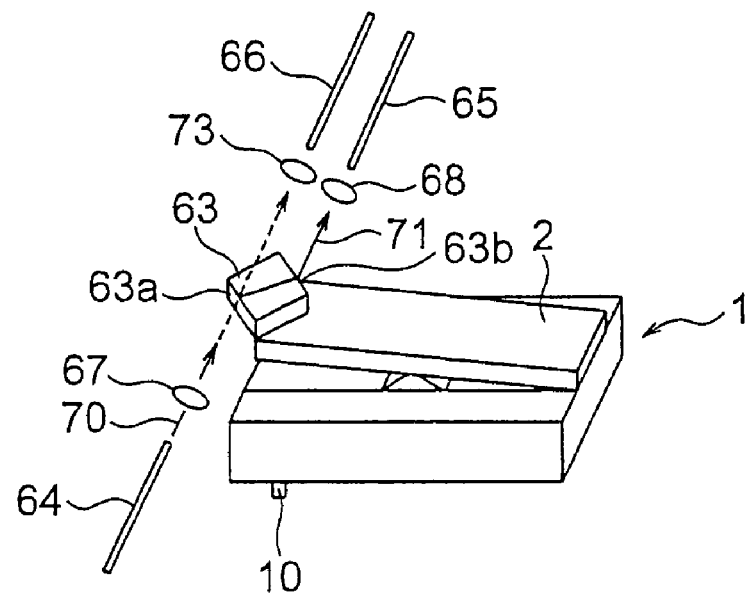
FIGS. 6A and 6B are perspective views schematically showing an optical switch according to a third embodiment of the present invention and showing states where an optical path is switched.
Figure 6B:
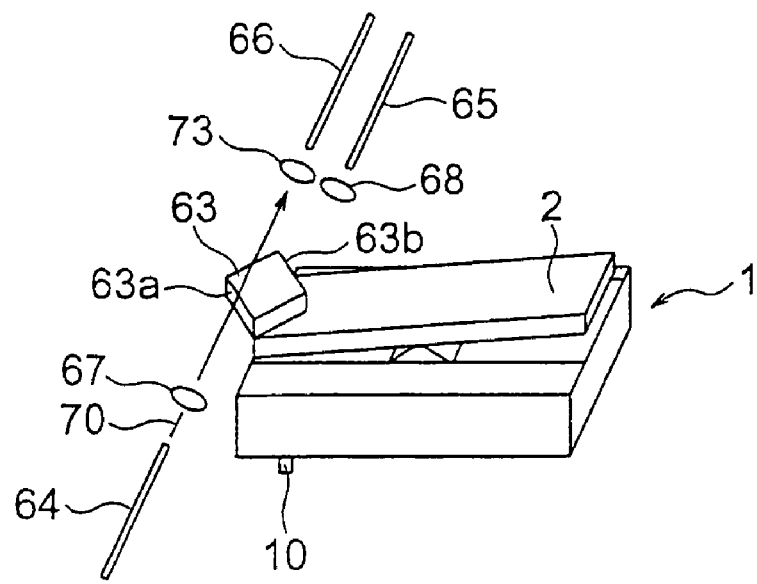

FIGS. 6A and 6B are perspective views schematically showing an optical switch according to a third embodiment of the present invention. FIGS. 6A and 6B show states where an optical path is switched.

In FIGS. 6A and 6B, the optical switch has an electromagnetic driving mechanism 1. The electromagnetic driving mechanism 1 has an armature 2 supported in such a manner that it can swing or oscillate, and electrode terminals 10 (only one is shown) for causing a current to flow through a coil included in the electromagnetic driving mechanism 1.

A transparent glass plate 63 is directly installed on an upper surface of one end portion of the armature 2 by a fixing method such as adhesion or soldering. The glass plate 63 is rectangular and has a plane of incidence 63a and a plane of emission 63b parallel to each other. Antireflection coating is provided on the plane of incidence 63a and the plane of emission 63b of the glass plate 63. The glass plate 63 is installed in such a manner that the plane of incidence 63a and the plane of emission 63b are substantially parallel to the oscillating direction of the armature 2 and the angle of incidence of light within a plane perpendicular to the oscillating direction is approximately within 45±40 degrees. Hereinafter, the end portion of the armature 2 where the glass plate 63 is installed is referred to as one end portion, and the end portion on the opposite side is referred to as the other end portion.

An incidence-side optical fiber 64 is installed on the incidence side of the glass plate 63, and emission-side optical fibers 65, 66 are installed on the emission side. Also a lens 67 for guiding emitted light from the incidence-side optical fiber 64 to the glass plate 63 is installed on the incidence side of the glass plate 63. On the emission side of the glass plate 63, a lens 68 for guiding light passed through the glass plate 63 to the emission-side optical fiber 65 is installed and a lens 73 for guiding light passed above the glass plate 63 to the emission-side optical fiber 66 is installed.

Using a manufacturing method that will be later described in detail, the electromagnetic driving mechanism 1, the optical fibers 64 to 66, and the lenses 67, 68, 73 are fixed to one casing by adhering, soldering, or welding.

The operation of the optical switch according to the third embodiment will now be described. FIG. 6A shows a state where the other end portion of the armature 2 is attracted to the U-shaped iron core. In this state, light 70 from the incidence-side optical fiber 64 becomes incident on the glass plate 63. FIG. 6B shows a state where one end portion of the armature 2 is attracted to the U-shaped iron core. In this state, the light 70 from the incidence-side optical fiber 64 passes above the glass plate 63.

In FIG. 6A, the light 70 from the incidence-side optical fiber 64 is collimated by the lens 67 and becomes incident on the glass plate 63 from the plane of incidence 63a. The light incident on the glass plate 63 travels through the glass plate 63 while being refracted at an angle in accordance with the Snell's law. The light shifts from the plane of incidence 63a into a direction that is parallel to the direction of incidence from the plane of emission 63b and refracted, and the light is thus emitted to be emitted light 71. The emitted light 71 is converged by the lens 68 and becomes incident on the emission-side optical fiber 65.

The quantity of shift δ of the emitted light 71 from the light 70 incident on the glass plate 63 is determined by the refractive index of the glass plate 63, the incident angle on the plane of incidence 63a and the distance between the plane of incidence 63a and the plane of emission 63b. For example, if the refractive index of the glass plate 63 is 1.5, the incident angle is 45 degrees and the distance is 4 mm, the quantity of shift δ is approximately 1.3 mm.

Next, when a current is caused to flow through the coil from the electrode terminals 10, the armature 2 turns counterclockwise into the state of FIG. 6B. In this state, the glass plate 63 moves downward. As a result, the light 70 from the incidence-side optical fiber 64 passes above the glass plate 63 and becomes incident on the emission-side optical fiber 66 through the lens 73.

To restore the state of FIG. 6A from the state of FIG. 6B, the current can be caused to flow through the electrode terminals 10 in the opposite direction.

By switching the direction of the current flowing through the electrode terminals 10 as described above, it is possible to switch the provision of the light 70 from the incidence-side optical fiber 64 to one of two output ports.

Meanwhile, the shape of the glass plate 63, the position of installation of the glass plate 63 and the diameter of light beam are designed in consideration of the moving distance of the armature 2 (normally 0.3 to 0.6 mm). That is, these are so set that most of the light 70 incident on the glass plate 63 passes through the glass plate 63 in the state of FIG. 6A, whereas most of the light 70 passes outside the glass plate 63 in the state of FIG. 6B.

The electromagnetic driving mechanism used in the third embodiment has the same structure as the electromagnetic driving mechanisms described with reference to FIGS. 1A to 1C, FIGS. 2A to 2C and FIGS. 3A to 3C. Therefore, the electromagnetic driving mechanism has been practically used for several years and highly reliable. For this electromagnetic driving mechanism, an inexpensive manufacturing method has been established. Moreover, the optical parts used for this electromagnetic driving mechanism are generally used for conventional optical devices. Therefore, the optical switch according to the third embodiment can be manufactured inexpensively. Moreover, since the glass plate 63 is fixed directly on the armature 2, miniaturization can be realized.

The optical switch according to the third embodiment has the following advantage, compared with the optical switches according to the first and second embodiments. As the switching operation of the optical switch is repeated many times, the turning angle of the armature of the electromagnetic driving mechanism may change. In the case a mirror is used as an optical path switching unit as in the first and second embodiments, if the turning angle of the armature changes by α, the change in the emission angle of reflected light from the mirror is 2α. As a result, the incident angle of light on the lens installed before the emission-side optical fiber changes largely. The change in the incident angle of light on the lens causes a change of the position of the convergence point (focus) on the incidence-side surface of the emission-side optical fiber and lowers the coupling efficiency of the incidence-side optical fiber and the emission-side optical fiber. Consequently, the energy loss increases.

On the other hand, in the case a glass plate is used as an optical path switching unit as in the third embodiment, if the turning angle of the armature of the electromagnetic driving mechanism changes, the above-described quantity of shift δ changes but the emission angle of emitted light from the glass plate 63 does not change. If the incident angle does not change, even though the incident position of light on the lens changes, the position of the convergence point on the incidence side surface of the emission-side optical fiber does not change. Therefore, the reduction in the coupling efficiency of the incidence-side optical fiber and the emission-side optical fiber is small. That is, the third embodiment has an advantage that a change in the turning angle of the armature of the electromagnetic driving mechanism has less effect than in the first and second embodiments.

Figure 7:
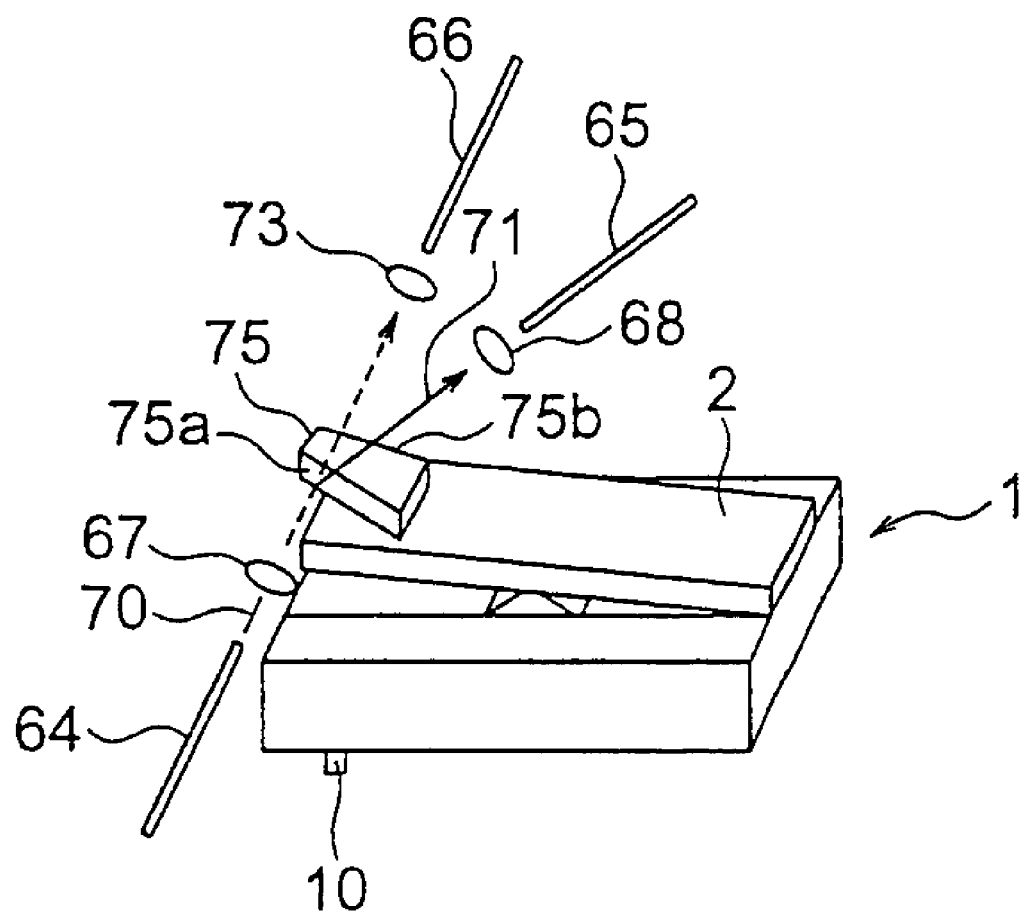
FIG. 7 is a perspective view schematically showing an optical switch according to a fourth embodiment of the present invention.

FIG. 7 is a perspective view schematically showing an optical switch according to a fourth embodiment of the present invention.

In FIG. 7, the optical switch has an electromagnetic driving mechanism 1. The electromagnetic driving mechanism 1 has an armature 2 supported in such a manner that it can swing or oscillate, and electrode terminals 10 (only one is shown) for causing a current to flow through a coil included in the electromagnetic driving mechanism 1.

A transparent glass plate 75 is directly installed on an upper surface of one end portion of the armature 2 by a fixing method such as adhesion or soldering. The glass plate 75 has a plane of incidence 75a and a plane of emission 75b that are parallel to the oscillating direction of the armature 2 but not parallel to each other. This can be realized, for example, by a glass plate having a trapezoidal planar shape. Antireflection coating is provided on the plane of incidence 75a and the plane of emission 75b of the glass plate 75. Hereinafter, the end portion of the armature 2 where the glass plate 75 is installed is referred to as one end portion, and the end portion on the opposite side is referred to as the other end portion.

An incidence-side optical fiber 64 is installed on the incidence side of the glass plate 75, and emission-side optical fibers 65, 66 are installed on the emission side. Also a lens 67 for guiding emitted light from the incidence-side optical fiber 64 to the glass plate 75 is installed on the incidence side of the glass plate 75. On the emission side of the glass plate 75, a lens 68 for guiding light passed through the glass plate 75 to the emission-side optical fiber 65 is installed and a lens 73 for guiding light passed above the glass plate 75 to the emission-side optical fiber 66 is installed.

Using a manufacturing method that will be later described in detail, the electromagnetic driving mechanism 1, the optical fibers 64 to 66, and the lenses 67, 68, 73 are fixed to one casing by adhering, soldering, or welding.

The operation of the optical switch according to the fourth embodiment will now be described. FIG. 7 shows a state where the other end portion of the armature 2 is attracted to the U-shaped iron core. In this state, light 70 from the incidence-side optical fiber 64 becomes incident on the glass plate 75. Although not shown, in a state where one end portion of the armature 2 is attracted to the U-shaped iron core, the light 70 from the incidence-side optical fiber 64 passes above the glass plate 75.

In FIG. 7, the light from the incidence-side optical fiber 64 is collimated by the lens 67 and becomes incident on the glass plate 75. The light incident on the glass plate 75 travels through the glass plate 75 while being refracted at an angle in accordance with the Snell's law. The light is emitted at an angle that is different from the direction of incidence, thus becoming emitted light 71. The emitted light 71 is converged by the lens 68 and becomes incident on the emission-side optical fiber 65.

Next, when a current is caused to flow through the coil from the electrode terminals 10, the armature 2 turns counterclockwise into the state where one end portion of the armature 2 is attracted to the U-shaped iron core. In this state, the glass plate 75 moves downward. As a result, the light 70 from the incidence-side optical fiber 64 passes above the glass plate 75 and becomes incident on the emission-side optical fiber 66 through the lens 73. To restore the state of FIG. 7 from the above state, the current can be caused to flow through the electrode terminals 10 in the opposite direction.

By switching the direction of the current flowing through the electrode terminals 10 as described above, it is possible to switch the provision of the light 70 from the incidence-side optical fiber 64 to one of two output ports.

In the case the incident light to the glass plate 75 and the emitted light from the glass plate 75 are not parallel to each other as in the fourth embodiment, a coupled optical system using one lens can be employed as the two optical fibers arranged closely to each other. That is, the lenses 68 and 73 can be replaced with one lens. Moreover, a two-core optical fiber installed in one ferrule can be used as the emission-side optical fibers 65, 66. As a result, the optical switch can be miniaturized further.

However, as described above, when the turning angle of the armature changes because of repeated switching operation, the emission angle of the emitted light 71 changes. This means that the change in the turning angle of the armature has more effect than in the optical switch according to the third embodiment. However, the change in the turning angle of the armature has less effect than in the optical switches according to the first and second embodiments.

Figure 8:
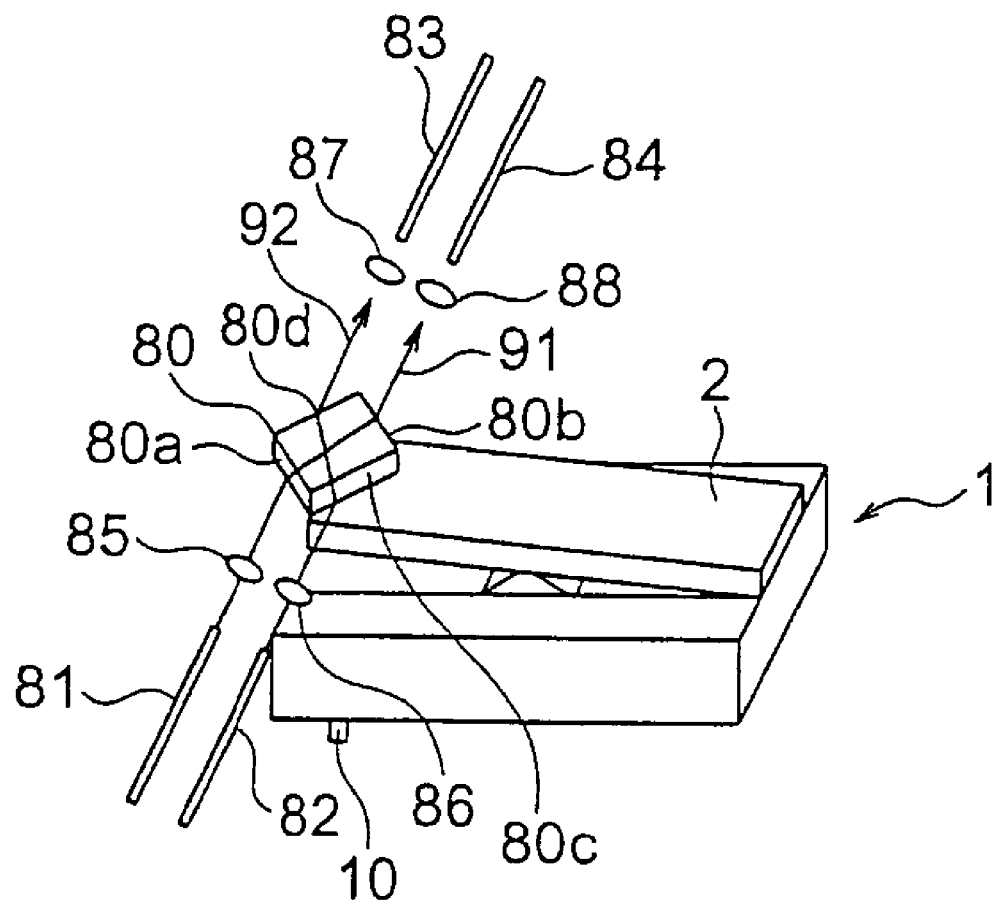
FIG. 8 is a perspective view schematically showing an optical switch according to a fifth embodiment of the present invention.

FIG. 8 is a perspective view schematically showing an optical switch according to a fifth embodiment of the present invention.

In FIG. 8, the optical switch has an electromagnetic driving mechanism 1. The electromagnetic driving mechanism 1 has an armature 2 supported in such a manner that it can swing or oscillate, and electrode terminals 10 (only one is shown) for causing a current to flow through a coil included in the electromagnetic driving mechanism 1.

A transparent glass plate 80 is directly installed on an upper surface of one end portion of the armature 2 by a fixing method such as adhesion or soldering. The glass plate 80 is rectangular and has two sets of planes of incidence and planes of emission, that is, a plane of incidence 80a and a plane of emission 80b, and a plane of incidence 80c and a plane of emission 80d, which are parallel to the oscillating direction of the armature 2 and parallel to each other. Antireflection coating is provided on the planes of incidence 80a, 80c and the planes of emission 80b, 80d of the glass plate 80. Hereinafter, the end portion of the armature 2 where the glass plate 80 is installed is referred to as one end portion, and the end portion on the opposite side is referred to as the other end portion.

Incidence-side optical fibers 81, 82 are installed on the incidence side of the glass plate 80, and emission-side optical fibers 83, 84 are installed on the emission side. Also lenses 85, 86 for guiding emitted light from the incidence-side optical fibers 81, 82 respectively to the glass plate 80 are installed on the incidence side of the glass plate 80. On the emission side of the glass plate 80, lenses 87, 88 corresponding to the emission-side optical fibers 83, 84 are installed.

Using a manufacturing method that will be later described in detail, the electromagnetic driving mechanism 1, the optical fibers 81 to 84, and the lenses 85 to 88 are fixed to one casing by adhering, soldering, or welding.

The operation of the optical switch according to the fifth embodiment will now be described. FIG. 8 shows a state where the other end portion of the armature 2 is attracted to the U-shaped iron core. In this state, lights from the incidence-side optical fibers 81, 82 become incident on the glass plate 80. Although not shown, in a state where one end portion of the armature 2 is attracted to the U-shaped iron core, the lights from the incidence-side optical fibers 81, 82 pass above the glass plate 80.

In FIG. 8, the light from the incidence-side optical fiber 81 is collimated by the lens 85 and becomes incident on the plane of incidence 80a of the glass plate 80. The incident light travels through the glass plate 80 while being refracted at an angle in accordance with the Snell's law. The light is emitted from the plane of emission 80b at an angle parallel to the direction of incidence and thus becomes emitted light 91. The emitted light 91 is converged by the lens 88 and becomes incident on the emission-side optical fiber 84. Similarly, the light from the incidence-side optical fiber 82 is collimated by the lens 86 and becomes incident on the plane of incidence 80c of the glass plate 80. The incident light travels through the glass plate 80 while being refracted at an angle in accordance with the Snell's law. The light is emitted from the plane of emission 80d at an angle parallel to the direction of incidence and thus becomes emitted light 92. The emitted light 92 is converged by the lens 87 and becomes incident on the emission-side optical fiber 83.

In the glass plate 80, the angle between the planes of incidence 80a and 80c, the angle between the planes of emission 80b and 80d, the spacing between the plane of incidence 80a and the plane of emission 80b, and the spacing between the plane of incidence 80c and the plane of emission 80d are set as follows. That is, these angle and spacings are so set that when a current is caused to flow through the coil from the electrode terminals 10, the armature 2 turns counterclockwise and therefore the glass plate 80 moves downward, the lights from the incidence-side optical fibers 81, 82 pass above the glass plate 80 and coincide with the optical paths of the emitted light 92, 91. For example, the glass plate 80 is caused to have a rhombic or square planar shape and one segment connecting diagonal vertexes of this rhombus or square is made parallel to the direction of incidence.

As described above, in the fifth embodiment, when the armature 2 is in the state of FIG. 8, the incidence-side optical fiber 81 and the emission-side optical fiber 84 are coupled to each other, and the incidence-side optical fiber 82 and the emission-side optical fiber 83 are coupled to each other. On the other hand, when the armature 2 turns counterclockwise, the incidence-side optical fiber 81 and the emission-side optical fiber 83 are coupled to each other, and the incidence-side optical fiber 82 and the emission-side optical fiber 84 are coupled to each other. As a result, the optical switch can perform 2×2 switch operations.

Figure 9:
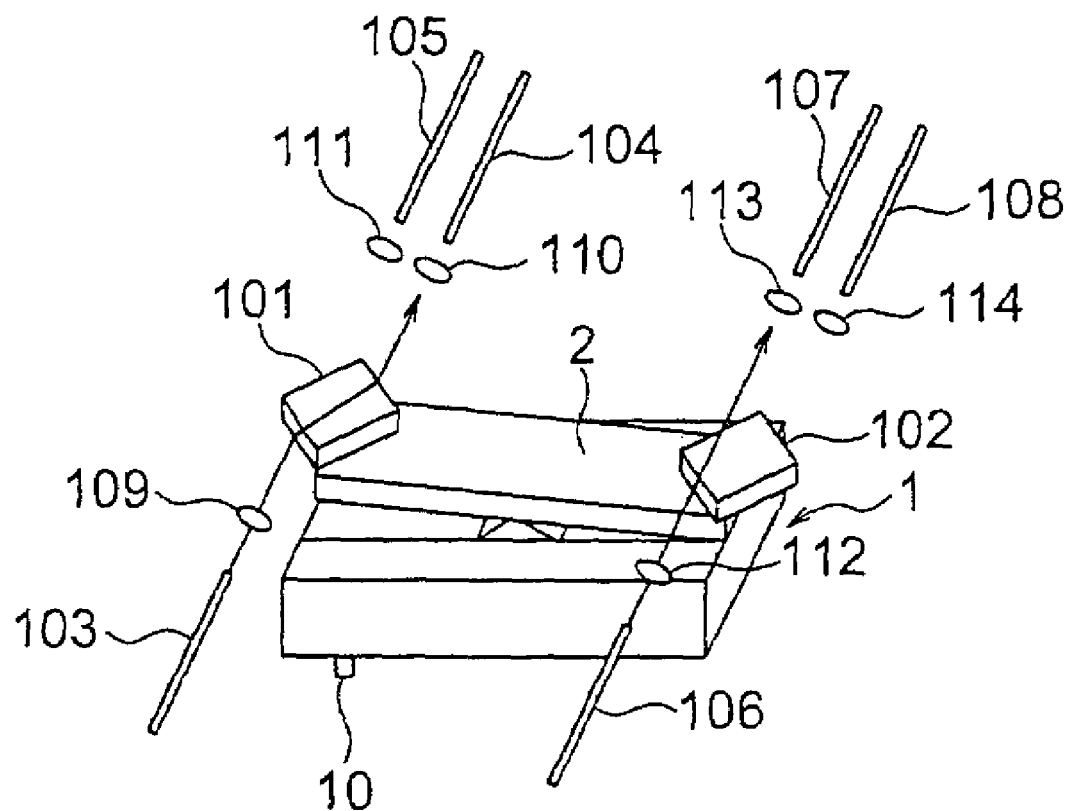
FIG. 9 is a perspective view schematically showing an optical switch according to a sixth embodiment of the present invention.

FIG. 9 is a perspective view schematically showing an optical switch according to a sixth embodiment of the present invention.

In FIG. 9, the optical switch has an electromagnetic driving mechanism 1. The electromagnetic driving mechanism 1 has an armature 2 supported in such a manner that it can swing or oscillate, and electrode terminals 10 (only one is shown) for causing a current to flow through a coil included in the electromagnetic driving mechanism 1.

Transparent glass plates 101, 102 are directly installed on upper surfaces of both end portions of the armature 2 by a fixing method such as adhesion or soldering. Each of the glass plates 101, 102 has a plane of light incidence and a plane of light emission parallel to the oscillating direction of the armature 2 and parallel to each other. The shapes of the glass plates 101, 102 and their angles to the direction of incidence of light are set to be the same as those of the glass plate 63 of the third embodiment shown in FIGS. 6A and 6B. Antireflection coating is provided on the planes of incidence and the planes of emission of the glass plates 101, 102.

An incidence-side optical fiber 103 is installed on the incidence side of the glass plate 101, and emission-side optical fibers 104, 105 are installed on the emission side. Similarly, an incidence-side optical fiber 106 is installed on the incidence side of the glass plate 102, and emission-side optical fibers 107, 108 are installed on the emission side. Also a lens 109 for guiding light from the incidence-side optical fiber 103 to the glass plate 101 is installed on the incidence side of the glass plate 101. On the emission side of the glass plate 101, lenses 110, 111 corresponding to the emission-side optical fibers 104, 105 are installed. Similarly, a lens 112 for guiding light from the incidence-side optical fiber 106 to the glass plate 102 is installed on the incidence side of the glass plate 102. On the emission side of the glass plate 102, lenses 113, 114 corresponding to the emission-side optical fibers 107, 108 are installed.

Using a manufacturing method that will be later described in detail the electromagnetic driving mechanism 1, the incidence-side optical fibers 103, 106, the emission-side optical fibers 104, 105, 107, 108 and the lenses 109 to 111, 112 to 114 are fixed to one casing by adhering, soldering, or welding.

FIG. 9 shows a state where the end portion of the armature 2 having the glass plate 102 installed thereon is attracted to the U-shaped iron core. A state where the end portion of the armature 2 having the glass plate 101 installed thereon is attracted to the U-shaped iron core is not shown.

In FIG. 9, the light from the incidence-side optical fiber 103 is collimated by the lens 109 and becomes incident on the glass plate 101. The incident light travels through the glass plate 101 while being refracted at an angle in accordance with the Snell's law and the light is emitted from the glass plate 101 at an angle parallel to the direction of incidence. The emitted light is converged by the lens 110 and becomes incident on the emission-side optical fiber 104. On the other hand, the light from the incidence-side optical fiber 106 is collimated by the lens 112 and passes above the glass plate 102. The light is then converged by the lens 113 and becomes incident on the emission-side optical fiber 107.

When a current is caused to flow through the coil from the electrode terminals 10 and the armature 2 turns counterclockwise, the following occurs. The light from the incidence-side optical fiber 103 is collimated by the lens 109 and passes above the glass plate 101. The light is then converged by the lens 111 and becomes incident on the emission-side optical fiber 105. On the other hand, the light from the incidence-side optical fiber 106 is collimated by the lens 112 and becomes incident on the glass plate 102. The incident light travels through the glass plate 102 at an angle in accordance with the Snell's law and the light is emitted from the glass plate 102 at an angle parallel to the direction of incidence. The emitted light is converged by the lens 114 and becomes incident on the emission-side optical fiber 108.

As described above, according to the sixth embodiment, a two-channel 1×2 optical switch can be realized. According to the sixth embodiment, a two-channel optical switch that is smaller and requires a smaller mounting area can be realized at a lower price than in the case of using two individual optical switches.

Figure 10A:
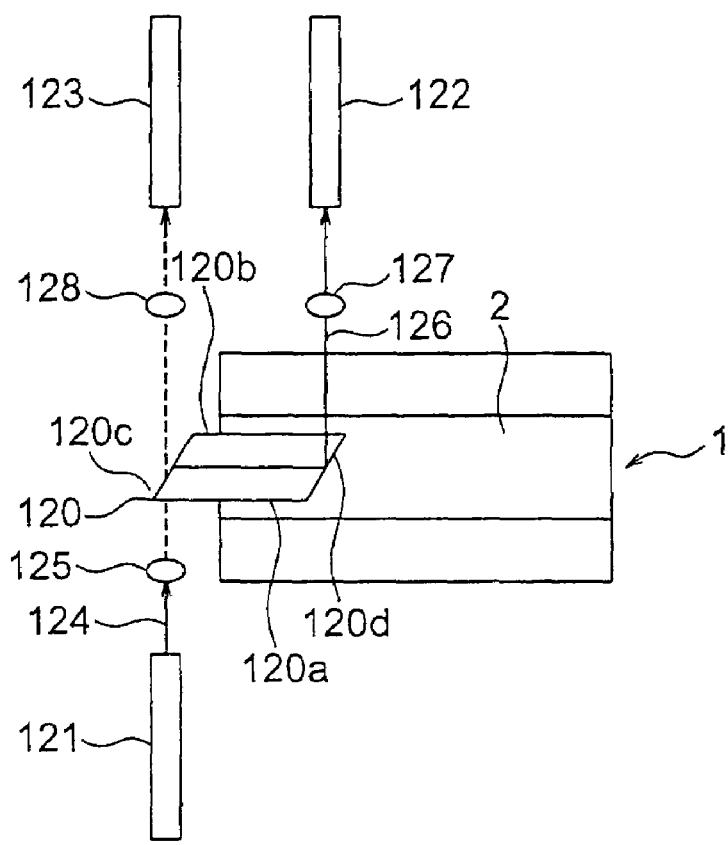
FIGS. 10A and 10B are top and side views schematically showing an optical switch according to a seventh embodiment of the present invention.
Figure 10B:
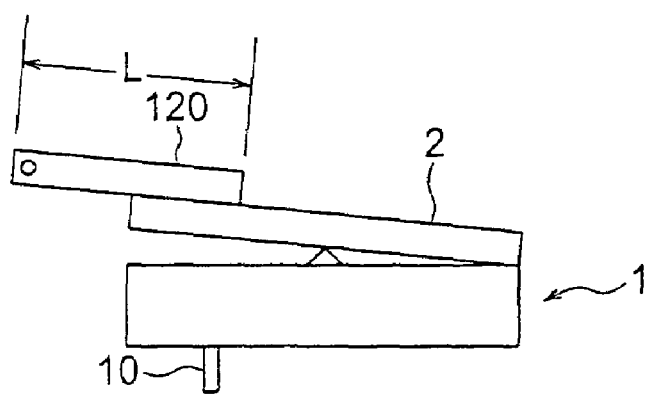

FIGS. 10A and 10B are views schematically showing an optical switch according to a seventh embodiment of the present invention. FIG. 10A is a top view and FIG. 10B is a side view.

In FIGS. 10A and 10B, the optical switch has an electromagnetic driving mechanism 1. The electromagnetic driving mechanism 1 has an armature 2 supported in such a manner that it can swing or oscillate, and electrode terminals 10 (only one is shown) for causing a current to flow through a coil included in the electromagnetic driving mechanism 1.

A transparent glass plate 120 is directly installed on an upper surface of one end portion of the armature 2 by a fixing method such as adhesion or soldering. The glass plate 120 has a parallelogrammatic planar shape. The length of the long sides of the parallelogram is expressed by L. The glass plate 120 has a plane of incidence 120a and a plane of emission 120b parallel to the oscillating direction of the armature 2 and parallel to each other. The glass plate 120 also has a plane 120c that is at an angle of approximately 45 degrees to the plane of incidence 120a, and also has a plane 120d that is at an angle of approximately 45 degrees to the plane of emission 120b. Hereinafter, the end portion of the armature 2 where the glass plate 120 is installed is referred to as one end portion, and the end portion on the opposite side is referred to as the other end portion.

An incidence-side optical fiber 121 is installed on the incidence side of the glass plate 120, and emission-side optical fibers 122, 123 are installed on the emission side. Also a lens 125 for guiding light 124 from the incidence-side optical fiber 121 to the glass plate 120 is installed on the incidence side of the glass plate 120. On the emission side of the glass plate 120, a lens 127 for guiding light 126 passed through the glass plate 120 to the emission-side optical fiber 122 is installed and a lens 128 for guiding light passed above the glass plate 120 to the emission-side optical fiber 123 is installed.

Using a manufacturing method that will be later described in detail, the electromagnetic driving mechanism 1, the incidence-side optical fiber 121, the emission-side optical fibers 122, 123, and the lenses 125, 127, 128 are fixed to one casing by adhering, soldering, or welding.

The operation of the optical switch according to the seventh embodiment will now be described. FIGS. 10A and 10B show a state where the other end portion of the armature 2 is attracted to the U-shaped iron core. In this state, the light 124 from the incidence-side optical fiber 121 becomes incident on the glass plate 120. A state where one end portion of the armature 2 is attracted to the U-shaped iron core is not shown.

In FIGS. 10A and 10B, the light 124 from the incidence-side optical fiber 121 is collimated by the lens 125 and becomes incident on the plane of incidence 120a of the glass plate 120. The plane of incidence 120a is substantially perpendicular to the direction of incidence of the light 124. The light incident on the glass plate 120 is totally reflected by the plane 120c into an angular direction of approximately 90 degrees with respect to the incident light and then totally reflected by the plane 120d into an angular direction of approximately 90 degrees. The totally reflected light is emitted from the plane of emission 120b, which is substantially perpendicular to the direction of reflection, and thus becomes the emitted light 126. The emitted light 126 is converged by the lens 127 and becomes incident on the emission-side optical fiber 122.

When a current is caused to flow through the coil from the electrode terminals 10, the armature 2 turns counterclockwise and the glass plate 120 moves downward. In this state, the light 124 from the incidence-side optical fiber 121 passes above the glass plate 120 and becomes incident on the emission-side optical fiber 123 through the lens 128.

By using the parallelogrammatic glass plate 120 as in the seventh embodiment, it is possible to realize the following effect. The quantity of parallel shift between the incident light 124 and the emitted light 126, that is, the spacing between the emission-side optical fibers 122 and 123, is determined by the length L of the glass plate 120. Therefore, a high degree of freedom is realized in designing to miniaturize the optical switch. Of course, in the seventh embodiment, even when the turning angle of the armature 2 changes because of repeated turning of the armature 2, it has less effect.

In the above-described third to seventh embodiments, the lenses are used as the unit for collimating light from the incidence-side optical fiber and making the light incident on the glass plate and as the unit for coupling the light emitted form the glass plate to the emission-side optical fiber. However, the lenses can be omitted if a TEC fiber having an expanded core part is used as the optical fiber.

In the sixth embodiment, the glass plate of the third embodiment is provided at both end portions of the armature 2. Similarly, in the fourth, fifth and seventh embodiments, the glass plate may be provided at both end portions of the armature 2, when necessary. In this case, a combination of the glass plates of the third, fourth, fifth and seventh embodiments, that is, two types of glass plates, may be provided at both end portion of the armature.

Figure 11:
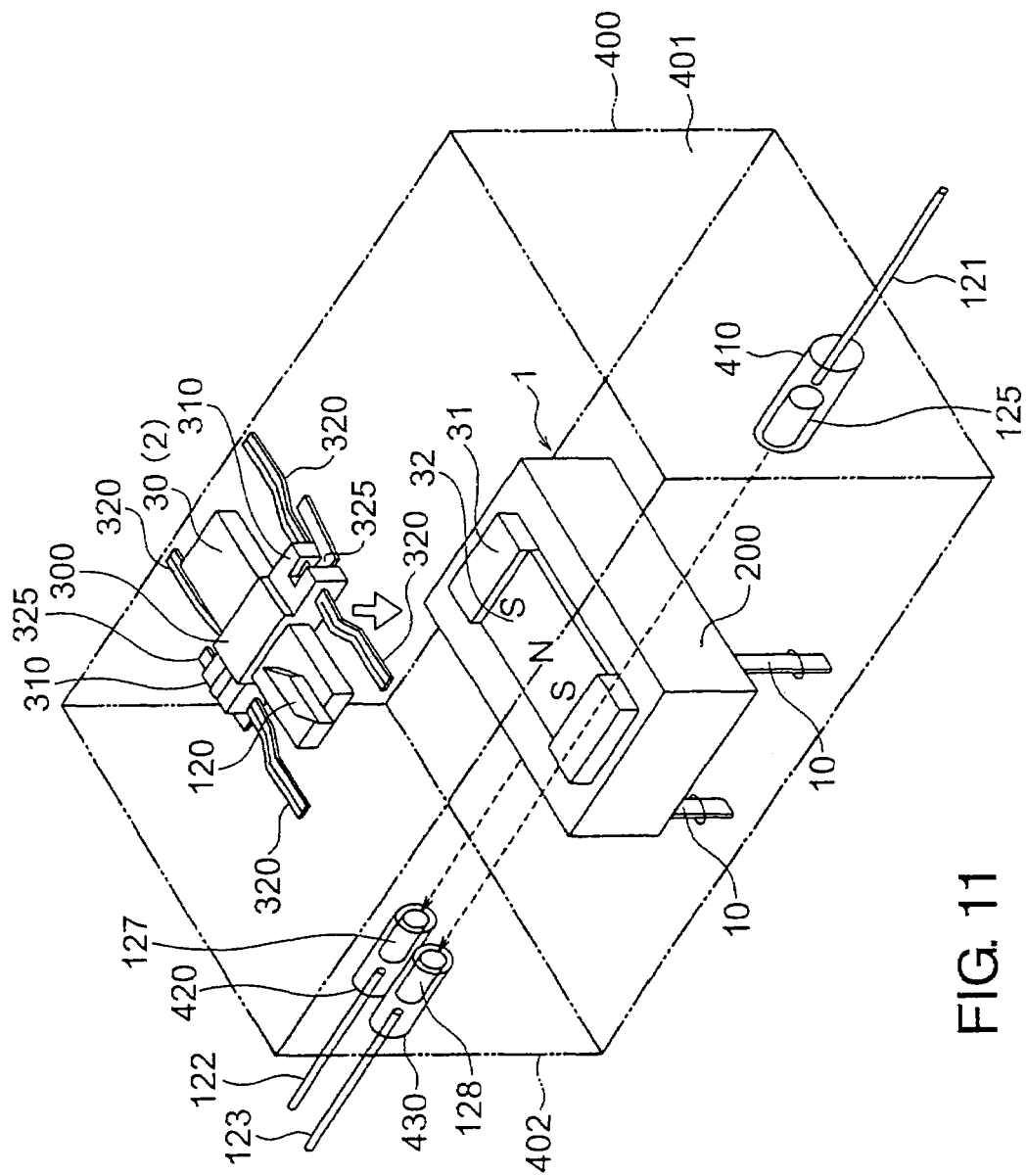
FIG. 11 is a view for explaining a manufacturing method for and the structure of the optical switch according to the present invention.

Now, the manufacturing method for and the structure of the optical switch according to the present invention will be described with reference to FIG. 11. FIG. 11 shows a case where the manufacturing method and structure are applied to the optical switch according to the seventh embodiment shown in FIGS. 10A and 10B, using the electromagnetic driving mechanism shown in FIGS. 2A to 2C, as a matter of convenience. However, the following manufacturing method and structure can be applied to any of the first to sixth embodiments. Of course, the electromagnetic driving mechanism shown in FIGS. 1A to 1C may be used instead of the electromagnetic driving mechanism shown in FIGS. 2A to 2C. In FIG. 11, a reference number in parentheses is the reference number shown in FIGS. 10A and 10B. In FIG. 11, the electromagnetic driving mechanism 1 and the optical system are separately shown in order to make the structure easy to understand.

In FIG. 11, the coil, the U-shaped iron core 31 and the permanent magnet 32 are housed in a fixed-side insulator base 200. The fixed-side insulator base 200 is formed, for example, by injection-molding a resin material. In this injection-molding, the entire coil, a part of the electrode terminals 10, a part of the U-shaped iron core 31 and a part of the permanent magnet 32 are embedded in the fixed-side insulator base 200. Therefore, the coil, the electrode terminals 10, the U-shaped iron core 31 and the permanent magnet 32 are integrally held.

As a matter of convenience, the armature 30, which is shown separately from the electromagnetic driving mechanism 1, is combined with the electromagnetic driving mechanism 1 as follows. The glass plate 120 is directly fixed at one end portion of the armature 30. A moving-side insulator 300 is provided around a central part of the armature 30. Also the moving-side insulator 300 is formed, for example, by injection-molding a resin material. In this injection-molding, the central part of the armature 30 is embedded in the moving-side insulator 300. Therefore, the armature 30 is held by the moving-side insulator 300. As described above with reference to FIGS. 2A to 2C, a protrusion as the fulcrum that protrudes downward is provided at a lower central portion of the armature 30.

The moving-side insulator 300 has a supporting part 310 at positions corresponding to both lateral sides in the direction of the width of the armature 30. On the supporting parts 310, moving spring parts 320, 320 are provided to extend along the armature 30 toward one end portion and the other end portion of the armature 30. A hinge spring part 325 is provided at a central portion of the moving spring parts 320, that is, a position corresponding to the supporting part 310. Also the moving spring parts 320 and the hinge spring parts 325 are integrally incorporated in the moving-side insulator 300 when molding the moving-side insulator 300. As the two hinge spring parts 325 are fixed onto an upper surface of the fixed-side insulator base 200 in a state where the protrusion on the armature 30 as the fulcrum is placed on the permanent magnet 32, the armature 30 is combined with the fixed-side insulator base 200. The hinge spring parts 325 are adapted for supporting the armature 30 while applying an energizing force or a damping force to the oscillating motion of the armature 30. The moving spring parts 320 are interlocked with the oscillating motion of the armature 30. As mentioned before, the moving spring parts 320 can be used as electric contacts for checking the state of the oscillating motion of the armature 2 or as electric contacts for checking the switching state.

The electromagnetic driving mechanism 1 manufactured as described above is housed in a casing 400 as the fixed-side insulator base 200 is fixed to an inner bottom surface of the casing 400. The electrode terminals 10 are led out from a bottom portion of the casing 400.

Meanwhile, the optical fibers and lenses are mounted on sidewalls of the casing 400 in the following manner. A cylinder member 410 housing a distal end portion of the incidence-side optical fiber 121 and the lens 125 is installed in sidewall 401 of the casing 400. In a sidewall 402 on the side opposite to the sidewall 401, a cylinder member 420 housing a distal end portion of the emission-side optical fiber 122 and the lens 127, and a cylinder member 430 housing a distal end portion of the emission-side optical fiber 123 and the lens 128 are installed in parallel.

According to the present invention, by combining an electromagnetic driving mechanism used in an existing electromagnetic relay with simple optical parts, it is possible to provide an optical switch that is more reliable, less expensive and smaller than a conventional mechanical optical switch.

What is claimed is:

1. An optical switch comprising:
an electromagnetic driving mechanism which comprises:
(a) a U-shaped magnetic core including two leg parts and an intermediate part between the two leg parts, (b) a coil wound on the U-shaped magnetic core, (c) a soft magnetic armature which includes two end portions respectively facing the two leg parts, and which is supported such that the armature is capable of making an oscillating motion, and (d) a permanent magnet provided to apply a magnetic flux to the U-shaped magnetic core and the armature;
at least one optical path switching unit directly fixed on the armature;
at least one incidence-side optical fiber for making light incident on the optical path switching unit; and
at least one emission-side optical fiber to receive light having an optical path switched by the optical path switching unit;
wherein the optical path switching unit comprises a first mirror, which is installed on the armature such that the first mirror reflects light within a plane that is substantially parallel to an oscillating direction of the armature.

2. The optical switch as claimed in claim 1, further comprising:
an incidence-side optical system for guiding the light from the incidence-side optical fiber to the optical path switching unit; and
an emission-side optical system for guiding the light having the optical path thereof switched by the optical path switching unit to the emission-side optical fiber.

3. The optical switch as claimed in claim 1, wherein the oscillating motion of the armature is a reciprocating turning motion about a fulcrum position near a central portion of the armature;
wherein the turning motion is generated by switching between: (a) a magnetically attracting force that acts between a first one of the leg parts of the U-shaped magnetic core and the corresponding facing end portions of the armature, and (b) a magnetically attracting force that acts between a second one of the leg parts of the U-shaped magnetic core and the corresponding facing end portion of the armature.

4. The optical switch as claimed in claim 1, wherein the at least one optical path switching unit is provided near at least one of the two end portions of the armature.

5. An optical switch comprising:
an electromagnetic driving mechanism which comprises: (a) a U-shaped magnetic core including two leg parts and an intermediate part between the two leg parts, (b) a coil wound on the U-shaped magnetic core, (c) a soft magnetic armature which includes two end portions respectively facing the two leg parts, and which is supported such that the armature is capable of making an oscillating motion, and (d) a permanent magnet provided to apply a magnetic flux to the U-shaped magnetic core and the armature;
at least one optical path switching unit directly fixed on the armature;
at least one incidence-side optical fiber for making light incident on the optical path switching unit; and
at least one emission-side optical fiber to receive light having an optical path switched by the optical path switching unit;
wherein the optical path switching unit comprises a transparent member, and the transparent member has a plane of light incidence and a plane of light emission which are substantially parallel to each other and which are substantially parallel to an oscillating direction of the armature.

6. The optical switch as claimed in claim 5, further comprising:
an incidence-side optical system for guiding the light from the incidence-side optical fiber to the optical path switching unit; and
an emission-side optical system for guiding the light having the optical path thereof switched by the optical path switching unit to the emission-side optical fiber.

7. The optical switch as claimed in claim 5, wherein the oscillating motion of the armature is a reciprocating turning motion about a fulcrum position near a central portion of the armature;
wherein the turning motion is generated by switching between: (a) a magnetically attracting force that acts between a first one of the leg parts of the U-shaped magnetic core and the corresponding facing end portions of the armature, and (b) a magnetically attracting force that acts between a second one of the leg parts of the U-shaped magnetic core and the corresponding facing end portion of the armature.

8. The optical switch as claimed in claim 5, wherein the at least one optical path switching unit comprises two optical path switching units directly fixed on the armature.

9. The optical switch as claimed in claim 5, wherein the transparent member has a rectangular flat shape.

10. The optical switch as claimed in claim 5, wherein the at least one optical path switching unit is provided near at least one of the two end portions of the armature.

11. The optical switch as claimed in claim 5, wherein at least one of the incidence-side optical fiber and the emission-side optical fiber is provided in plural numbers.

12. The optical switch as claimed in claim 5, wherein the permanent magnet is arranged between the U-shaped magnetic core and the armature, such that a first magnetic pole end of the permanent magnet is positioned near a center of an intermediate part of the U-shaped magnetic core, while a second magnetic pole end of the permanent magnet is positioned near a fulcrum of the oscillating motion of the armature.

13. The optical switch as claimed in claim 5, wherein the permanent magnet comprises a composite permanent magnet having a first magnetic pole on both ends thereof and a second magnetic pole at a central portion thereof; and
wherein the permanent magnet is provided between the two leg parts of the U-shaped magnetic core.

14. The optical switch as claimed in claim 5, wherein the permanent magnet is fixed to the armature such that a first magnetic pole thereof is in contact with the armature, and such that the permanent magnet oscillates together with the armature.

15. The optical switch as claimed in claim 5, wherein the electromagnetic driving mechanism further comprises:
a fixed-side insulator base for integrally holding the U-shaped magnetic core and the permanent magnet; and
a moving-side insulator for holding the armature; and
wherein the U-shaped magnetic core and the permanent magnet are fixed by integral molding of the fixed-side insulator base, with the permanent magnet being held in contact with a part of the U-shaped magnetic core.

16. The optical switch as claimed in claim 5, wherein the electromagnetic driving mechanism further comprises
a hinge spring part for supporting the armature while applying one of an energizing force and a damping force to the oscillating motion of the armature; and
a moving spring part interlocked with the oscillating motion of the armature.

17. An optical switch comprising:
an electromagnetic driving mechanism which comprises: (a) a U-shaped magnetic core including two leg parts and an intermediate part between the two leg parts, (b) a coil wound on the U-shaped magnetic core, (c) a soft magnetic armature which includes two end portions respectively facing the two leg parts, and which is supported such that the armature is capable of making an oscillating motion, and (d) a permanent magnet provided to apply a magnetic flux to the U-shaped magnetic core and the armature;
at least one optical path switching unit directly fixed on the armature;
at least one incidence-side optical fiber for making light incident on the optical path switching unit; and
at least one emission-side optical fiber to receive light having an optical path switched by the optical path switching unit;
wherein the optical path switching unit comprises a transparent member, and the transparent member has a plane of light incidence and a plane of light emission which are not parallel to each other and which are substantially parallel to an oscillating direction of the armature.

18. The optical switch as claimed in claim 17, further comprising:
- an incidence-side optical system for guiding the light from the incidence-side optical fiber to the optical path switching unit; and
- an emission-side optical system for guiding the light having the optical path thereof switched by the optical path switching unit to the emission-side optical fiber.

19. The optical switch as claimed in claim 17, wherein the oscillating motion of the armature is a reciprocating turning motion about a fulcrum position near a central portion of the armature;
- wherein the turning motion is generated by switching between: (a) a magnetically attracting force that acts between a first one of the leg parts of the U-shaped magnetic core and the corresponding facing end portions of the armature, and (b) a magnetically attracting force that acts between a second one of the leg parts of the U-shaped magnetic core and the corresponding facing end portion of the armature.

20. The optical switch as claimed in claim 17, wherein the at least one optical path switching unit is provided near at least one of the two end portions of the armature.

* * * * *